US008430117B2

(12) United States Patent
Mitrovich

(10) Patent No.: US 8,430,117 B2
(45) Date of Patent: Apr. 30, 2013

(54) REFUELING APPARATUS

(76) Inventor: Michael J. Mitrovich, Kenmore, WA (US)

( * ) Notice: Subject to any disclaimer, the term of this patent is extended or adjusted under 35 U.S.C. 154(b) by 511 days.

(21) Appl. No.: 12/767,310

(22) Filed: Apr. 26, 2010

(65) Prior Publication Data

US 2011/0259473 A1 Oct. 27, 2011

(51) Int. Cl.
*F16K 31/18* (2006.01)

(52) U.S. Cl.
USPC ............................ 137/413; 141/198; 141/303

(58) Field of Classification Search .................. 137/398, 137/409, 412, 413, 415; 141/198, 303; 251/33, 251/41, 43
See application file for complete search history.

(56) References Cited

U.S. PATENT DOCUMENTS

| | | | | |
|---|---|---|---|---|
| 751,096 | A | | 2/1904 | Nethery |
| 993,628 | A | | 5/1911 | Williams |
| 1,209,355 | A | * | 12/1916 | Sutherland et al. ........... 137/415 |
| 1,302,538 | A | | 5/1919 | Gulick |
| 1,525,247 | A | | 2/1925 | Leiss |
| 1,555,755 | A | | 9/1925 | Pratt |
| 1,676,084 | A | | 7/1928 | Flagg |
| 1,694,072 | A | | 12/1928 | Manion |
| 1,788,827 | A | | 1/1931 | Ferrin |
| 1,826,088 | A | | 10/1931 | Ostlind |
| 2,092,670 | A | | 9/1937 | Hess |
| 2,477,186 | A | | 7/1949 | Koehler |
| 2,595,166 | A | | 4/1952 | Rhodes |
| 2,825,526 | A | | 3/1958 | Zuiderhoek |
| 3,020,924 | A | | 2/1962 | Davies |
| 3,055,405 | A | | 9/1962 | Pase |
| 3,156,271 | A | | 11/1964 | Schnurmann |
| 3,168,105 | A | | 2/1965 | Cisco et al. |
| 3,269,404 | A | | 8/1966 | Lebow |
| 3,335,746 | A | | 8/1967 | Lebow |
| 3,406,709 | A | | 10/1968 | Elbogen et al. |
| 3,485,262 | A | | 12/1969 | Perren |
| 3,561,465 | A | | 2/1971 | de Graaf |
| 3,587,622 | A | | 6/1971 | Hardison |
| 3,618,643 | A | | 11/1971 | Thomson et al. |
| 3,662,793 | A | | 5/1972 | Calisher et al. |
| 3,892,254 | A | | 7/1975 | Hilgert |
| 3,907,248 | A | | 9/1975 | Coulbeck |
| 3,929,155 | A | | 12/1975 | Garretson |
| 3,982,557 | A | | 9/1976 | Acevedo |
| 4,006,762 | A | | 2/1977 | Badger |
| 4,024,887 | A | | 5/1977 | McGregor |

(Continued)

FOREIGN PATENT DOCUMENTS

| | | |
|---|---|---|
| EP | 144549 | 6/1985 |
| GB | 1153381 | 5/1969 |

(Continued)

OTHER PUBLICATIONS

Pursuant to MPEP § 2001.6(b) Applicant brings the following co-pending application to the Examiner's attention: U.S. Appl. No. 13/183,905.

(Continued)

*Primary Examiner* — Craig Schneider
*Assistant Examiner* — Craig J Price
(74) *Attorney, Agent, or Firm* — Buchanan Nipper

(57) ABSTRACT

A combination float control module and fluid flow control valve for use in high pressure, high flow rate refueling systems.

18 Claims, 14 Drawing Sheets

U.S. PATENT DOCUMENTS

| | | | |
|---|---|---|---|
| 4,064,907 A | 12/1977 | Billington | |
| 4,075,912 A | 2/1978 | Schaefer | |
| 4,161,188 A | 7/1979 | Jorgensen | |
| 4,305,422 A | 12/1981 | Bannink | |
| 4,312,373 A | 1/1982 | Tilling et al. | |
| 4,313,459 A | 2/1982 | Mylander | |
| 4,515,178 A | 5/1985 | Campau | |
| 4,522,226 A * | 6/1985 | Yamagiwa | 137/413 |
| 4,527,593 A | 7/1985 | Campau | |
| 4,770,317 A | 9/1988 | Podgers et al. | |
| 5,002,154 A | 3/1991 | Chen | |
| 5,027,871 A | 7/1991 | Guenther | |
| 5,279,121 A | 1/1994 | Barber | |
| 5,282,496 A | 2/1994 | Kerger | |
| 5,285,812 A | 2/1994 | Morales | |
| 5,354,101 A | 10/1994 | Anderson, Jr. | |
| 5,454,421 A | 10/1995 | Kerger | |
| 5,460,197 A | 10/1995 | Kerger | |
| 5,487,404 A | 1/1996 | Kerger | |
| 5,642,752 A | 7/1997 | Yokota | |
| 5,649,577 A | 7/1997 | Farkas | |
| 5,787,942 A | 8/1998 | Preston | |
| 5,813,432 A | 9/1998 | Elsdon | |
| 5,829,465 A | 11/1998 | Garretson | |
| 5,832,953 A | 11/1998 | Lattner | |
| 5,842,500 A | 12/1998 | Rockwood | |
| 5,887,609 A | 3/1999 | Garretson | |
| 5,921,272 A | 7/1999 | Cavagna | |
| 5,954,101 A | 9/1999 | Drube | |
| 5,992,445 A | 11/1999 | Pagani | |
| 6,026,841 A | 2/2000 | Kozik | |
| D421,788 S | 3/2000 | Kingman | |
| 6,035,888 A | 3/2000 | Gil | |
| 6,076,546 A | 6/2000 | Waters | |
| 6,078,850 A | 6/2000 | Kane et al. | |
| 6,079,438 A | 6/2000 | Cavagna | |
| 6,082,392 A | 7/2000 | Watkins, Jr. | |
| 6,109,314 A | 8/2000 | Christophe | |
| 6,138,709 A | 10/2000 | Home | |
| 6,178,994 B1 | 1/2001 | Park | |
| 6,227,233 B1 | 5/2001 | Kozik | |
| 6,230,730 B1 | 5/2001 | Garretson | |
| 6,247,492 B1 | 6/2001 | Stuart | |
| 6,257,287 B1 | 7/2001 | Kippe | |
| 6,263,905 B1 | 7/2001 | Yokota | |
| 6,293,302 B1 | 9/2001 | Waters | |
| 6,311,723 B1 | 11/2001 | Shipp | |
| 6,318,406 B1 | 11/2001 | Conley | |
| 6,318,421 B1 | 11/2001 | Lagache | |
| 6,408,869 B1 | 6/2002 | Bartos | |
| 6,415,813 B1 | 7/2002 | Kraft | |
| 6,450,196 B1 | 9/2002 | Bartos | |
| 6,536,465 B2 | 3/2003 | David et al. | |
| 6,557,579 B2 | 5/2003 | Kozik | |
| 6,640,829 B1 | 11/2003 | Kerger | |
| 6,810,905 B1 | 11/2004 | Watson | |
| 6,837,262 B2 | 1/2005 | Cortez et al. | |
| 6,837,263 B2 | 1/2005 | Kramer | |
| 6,874,528 B2 | 4/2005 | Kozik | |
| 6,910,499 B2 | 6/2005 | Chan | |
| 7,089,974 B2 | 8/2006 | Stuart | |
| 7,258,130 B2 | 8/2007 | Cortez | |
| D559,358 S | 1/2008 | Moura de Oliveira | |
| 7,584,766 B2 | 9/2009 | David et al. | |
| 7,584,966 B2 | 9/2009 | Snow | |
| 7,647,163 B2 | 1/2010 | Allen | |
| 7,757,709 B2 | 7/2010 | Cortez | |
| 7,793,682 B2 | 9/2010 | Smit | |
| 7,891,373 B2 | 2/2011 | Workman et al. | |
| 8,025,076 B2 | 9/2011 | Smit | |
| 2005/0274428 A1 | 12/2005 | Grabher | |
| 2008/0178944 A1 | 7/2008 | Workman | |

FOREIGN PATENT DOCUMENTS

| | | |
|---|---|---|
| GB | 1193007 | 5/1970 |
| GB | 1335188 | 10/1973 |
| GB | 1440107 | 6/1976 |
| GB | 1541110 | 2/1979 |
| GB | 2317382 | 3/1998 |
| JP | 6069839 B2 | 9/1994 |
| JP | 2003-506238 A | 2/2003 |
| JP | 2004-116858 A | 4/2004 |
| KR | 10-2002-0059682 A | 7/2002 |

OTHER PUBLICATIONS

Pursuant to MPEP § 2001.6(b) Applicant brings the following co-pending application to the Examiner's attention: U.S. Appl. No. 12/485,646.

International Search Report and Written Opinion, PCT/US2011/030445, Dec. 7, 2011.

Office Action dated Feb. 13, 2012, Applicant's co-pending U.S. Appl. No. 12/485,646.

* cited by examiner

REFUELING APPARATUS

FIELD OF THE INVENTIVE CONCEPT(S)

The disclosed inventive concept(s) relates to generally to refueling apparatuses configured for automatically stopping when a desired refueling level is attained.

BACKGROUND OF THE INVENTIVE CONCEPT(S)

A variety of applications require the ability to rapidly fill a container with a fluid. To accomplish this rapid filling, the fluid is typically pumped (under pressure) into the container. Due to this rapid filling, such applications typically include means for quickly shutting off the flow of fluid when the container reaches a predetermined level of fluid held therein so as to prevent overfilling and/or spillage of the fluid.

DESCRIPTION OF THE PREFERRED EMBODIMENTS

Figure 1:
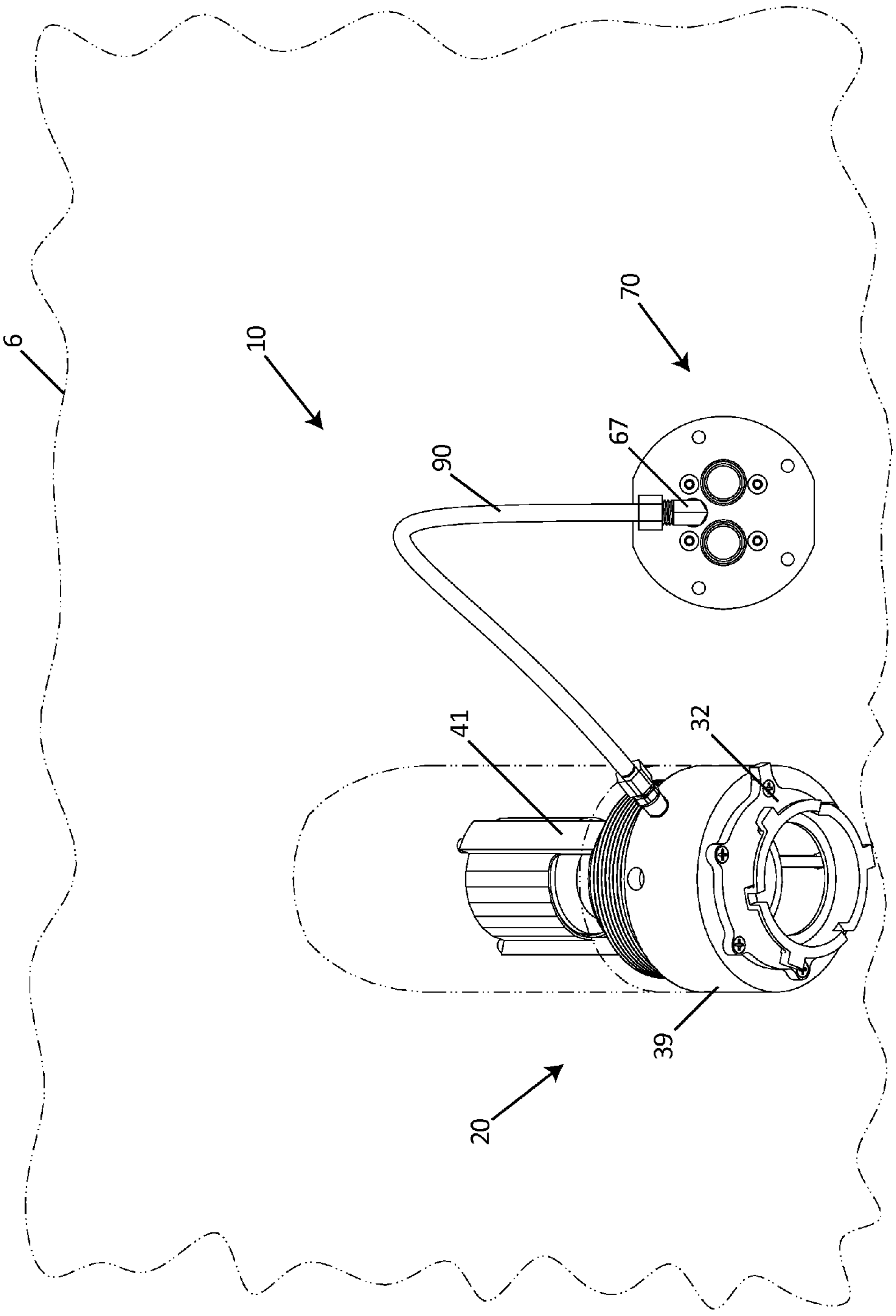
FIG. 1 is an upper perspective view of one embodiment of the inventive concept(s), shown installed on a fuel tank.

While the inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the inventive concept(s) is to cover all modifications, alternative constructions, and equivalents falling within the spirit and scope of the claimed inventive concept(s).

Further, in the following description and in the figures, like elements are identified with like reference numerals. The use of "or" indicates a non-exclusive alternative without limitation unless otherwise noted. The use of "including" means "including, but not limited to," unless otherwise noted.

FIGS. 1-9 show one embodiment of a refueling apparatus 10 with an automatic stop. The refueling apparatus comprising a fluid flow control valve 20 which, working in concert with a float valve (float control module) 70, can be opened or closed, thereby shutting off a flow of fuel into a container 6 (e.g., fuel tank). A more specific example of a float control module 170 can be seen in FIGS. 10-16. The container having air space above a fluid space, surface of the fluid space defining a fluid level within said container.

The receptacle 32 of a dry disconnect coupling (comprising a coupler and a receptacle), such as those made by Whitaker, connects to the fluid flow control valve 20. This receptacle 32 configured for mating with the dry disconnect coupling's coupler (not shown). A single point dry break coupler is preferred, with API style dry break couplers likewise being useful. The dry disconnect coupling 30 allowing a fluid conduit (not shown), such as a fuel supply line, to be fluidly connected with a container, such as a fuel tank on a diesel locomotive. The utilization of a dry disconnect coupling is well known in the prior art, for instance as shown in U.S. Pat. No. 6,155,294 to Cornford.

In operation, upon connecting the coupler to the receptacle 32 of the valve body 40, a lever (not shown in the drawings) is engaged which causes the poppet valve of the coupler to force open the poppet valve 33 of the receptacle 32 (or vice versa), thereby allowing fluid to be pumped from the fluid conduit, through the dry disconnect coupling and into the fluid flow control valve 20. Upon disengagement of the lever, the poppet valve of the coupler moves away from the poppet valve 33 of the receiver, allowing the receiver's poppet valve 33 to close, thereby preventing spillage of fluid (fuel) out of the receptacle (tank) after filling (fueling) is complete (at disconnect).

Figure 4:
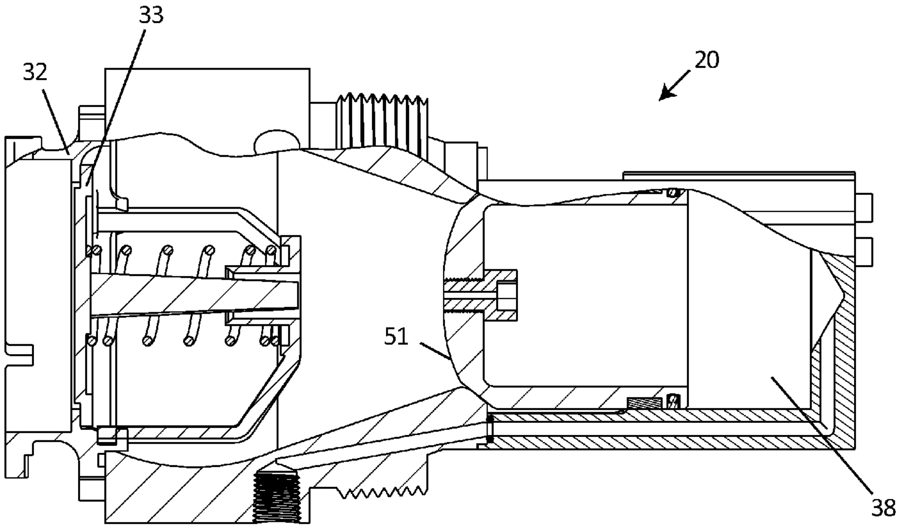
FIG. 4 is a cross-sectional, side view of a first embodiment of a fluid flow control valve of the inventive concept(s), shown with the valve closed.
Figure 6:
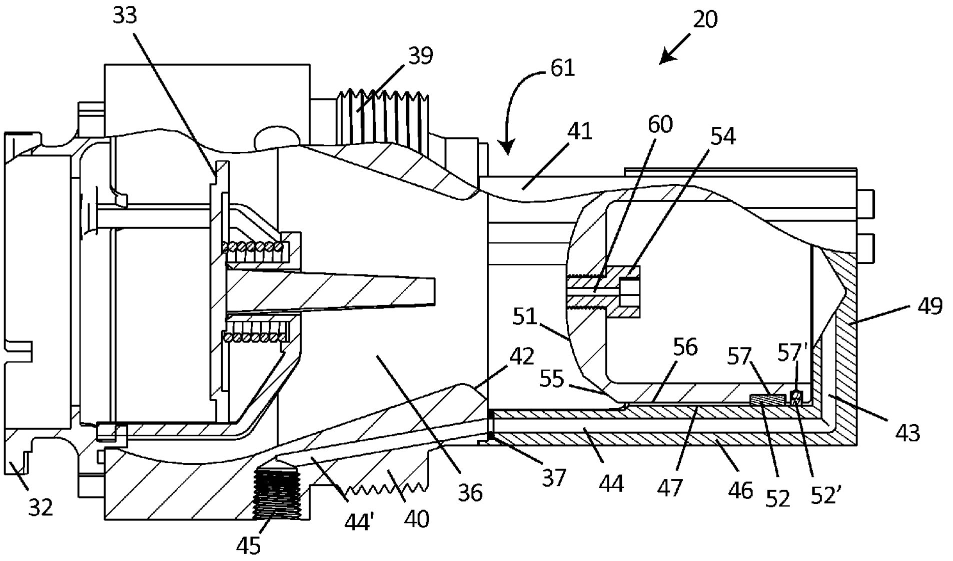
FIG. 6 is a cross-sectional, side view of a first embodiment of a fluid flow control valve of the inventive concept(s), shown with the valve open.
Figure 5:
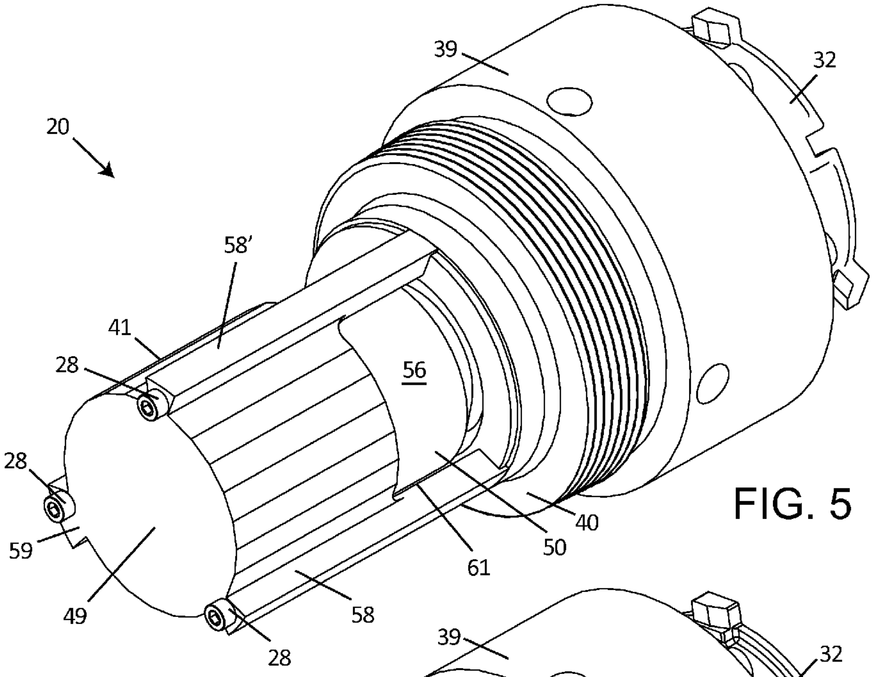
FIG. 5 is a perspective view of the embodiment of FIG. 4, shown with the valve closed.
Figure 7:
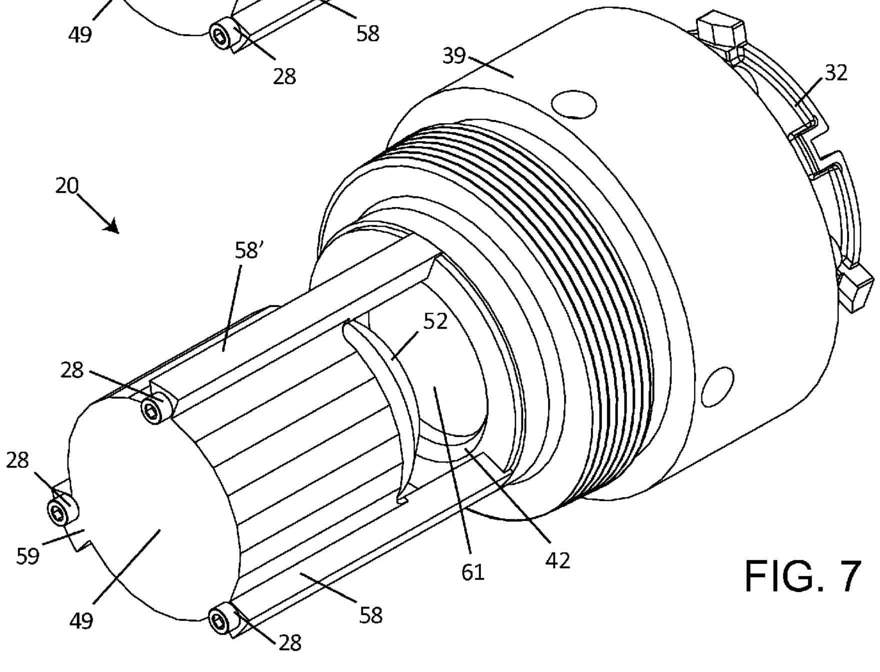
FIG. 7 is a perspective view of the embodiment of FIG. 4, shown with the valve open.
Figure 8:
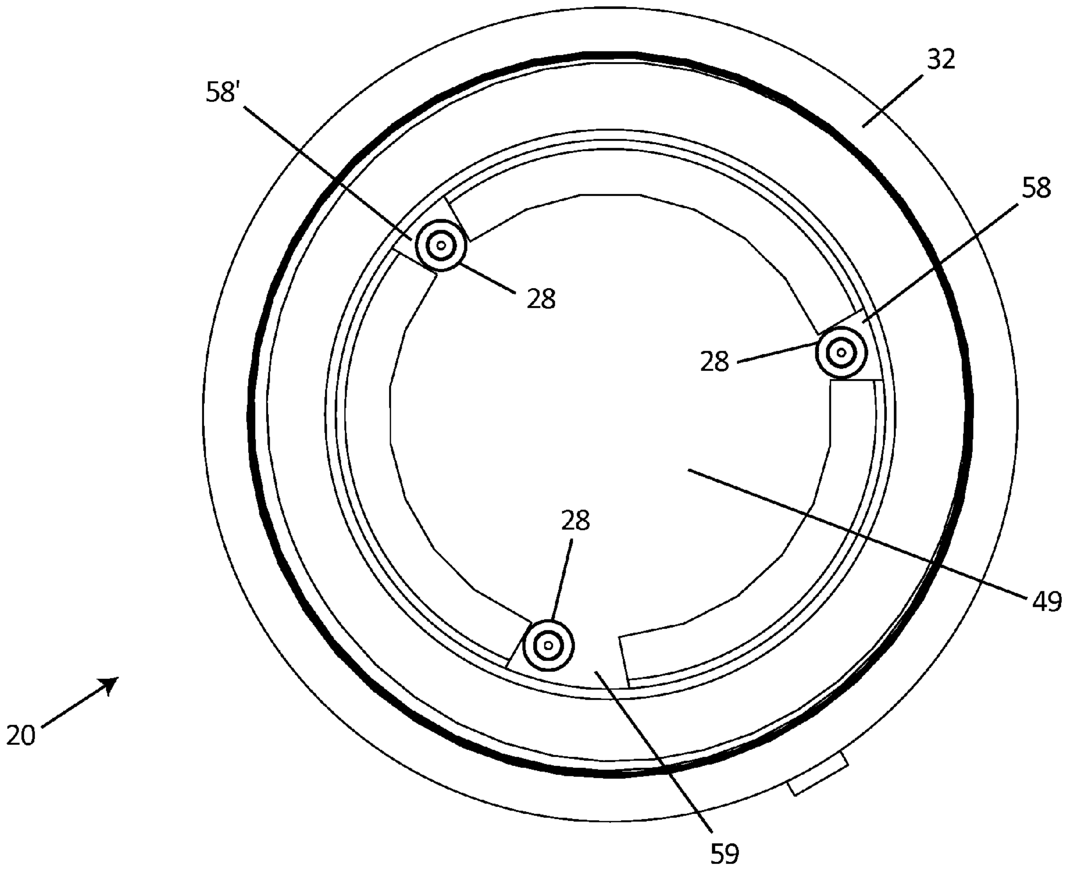
FIG. 8 is an end view of the embodiment of FIG. 4.
Figure 9:
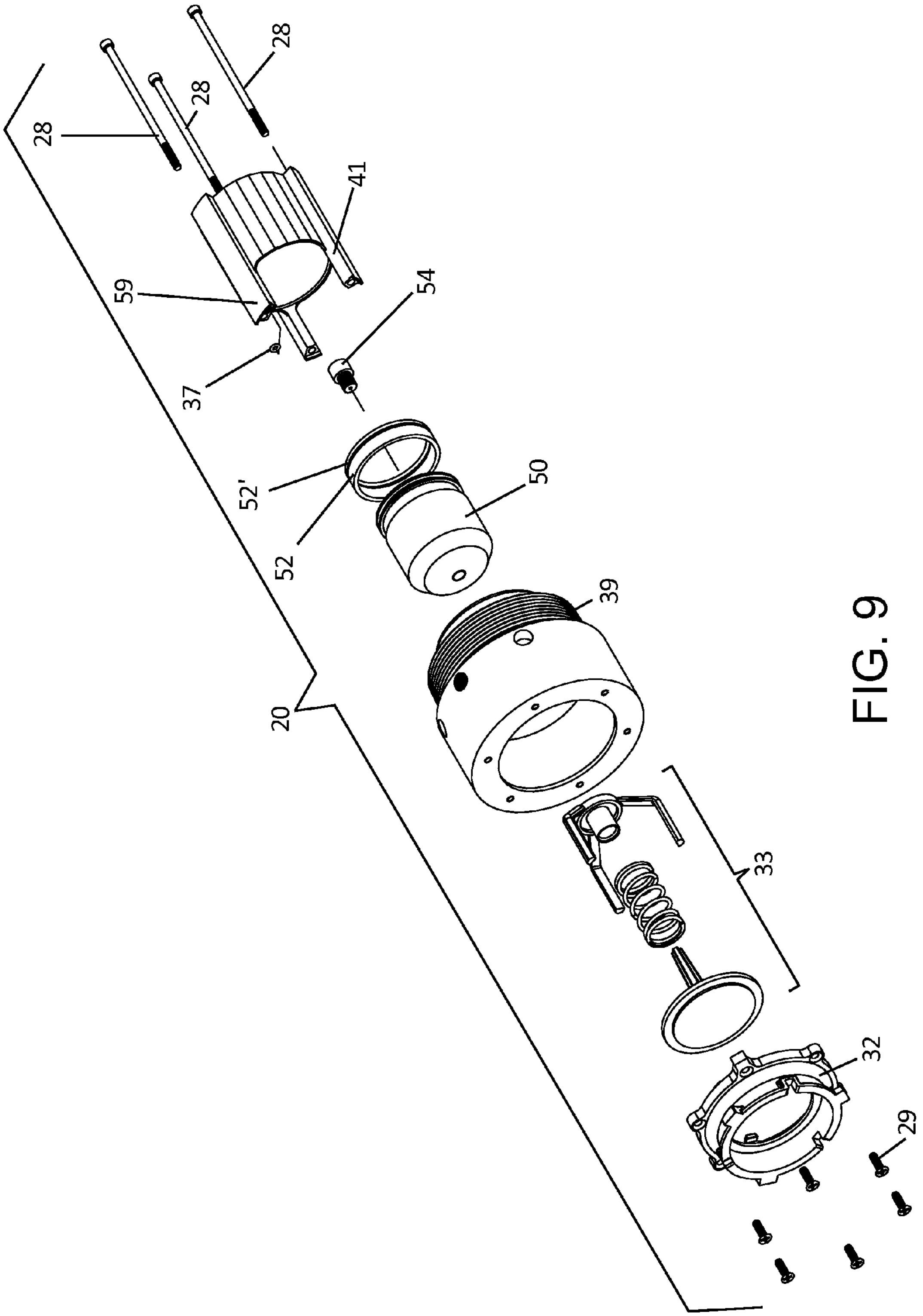
FIG. 9 is an exploded view of the embodiment of FIG. 4.
Figure 10:
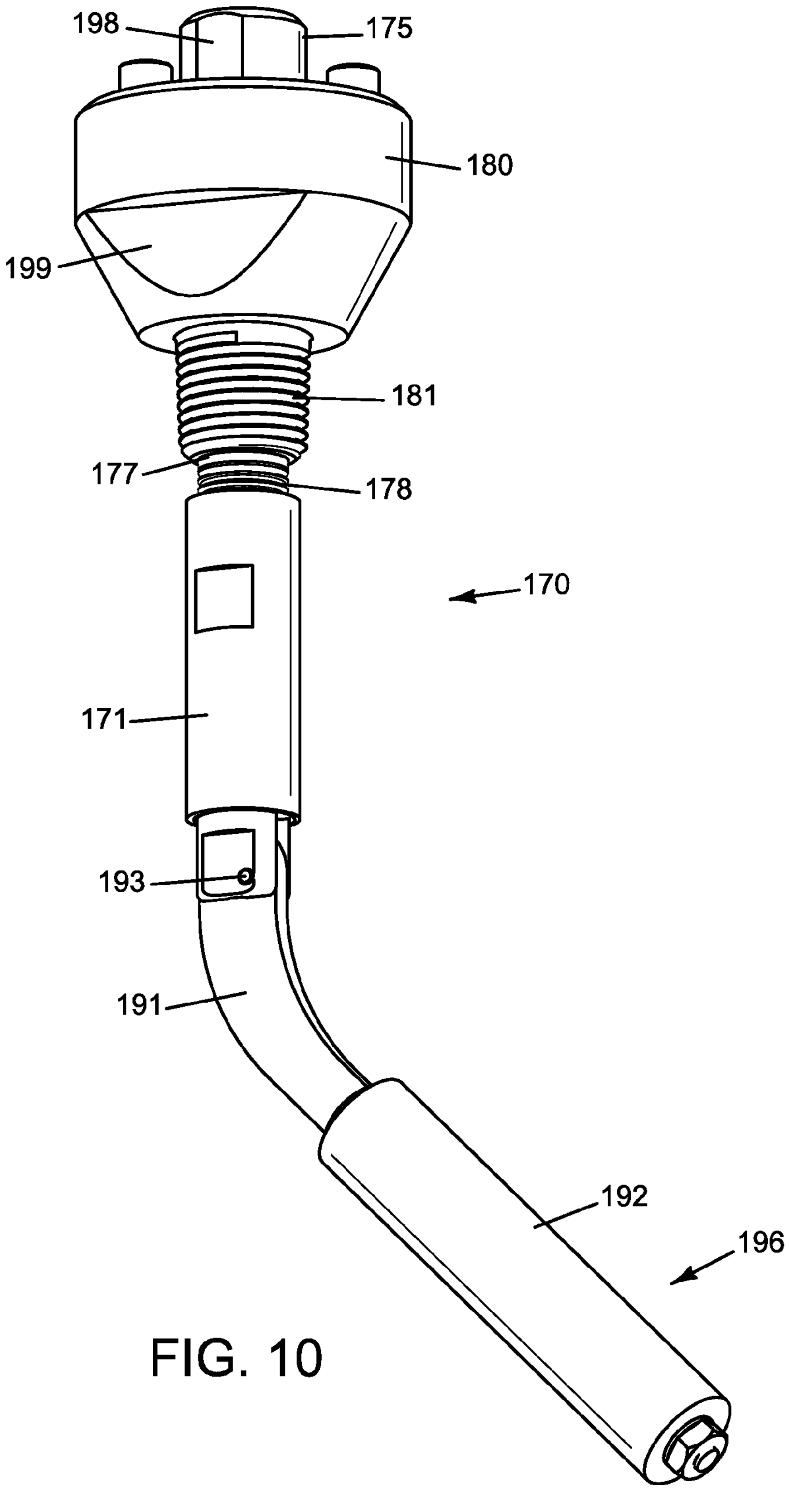
FIG. 10 is a side, perspective view of a second embodiment of a float valve.
Figure 11:
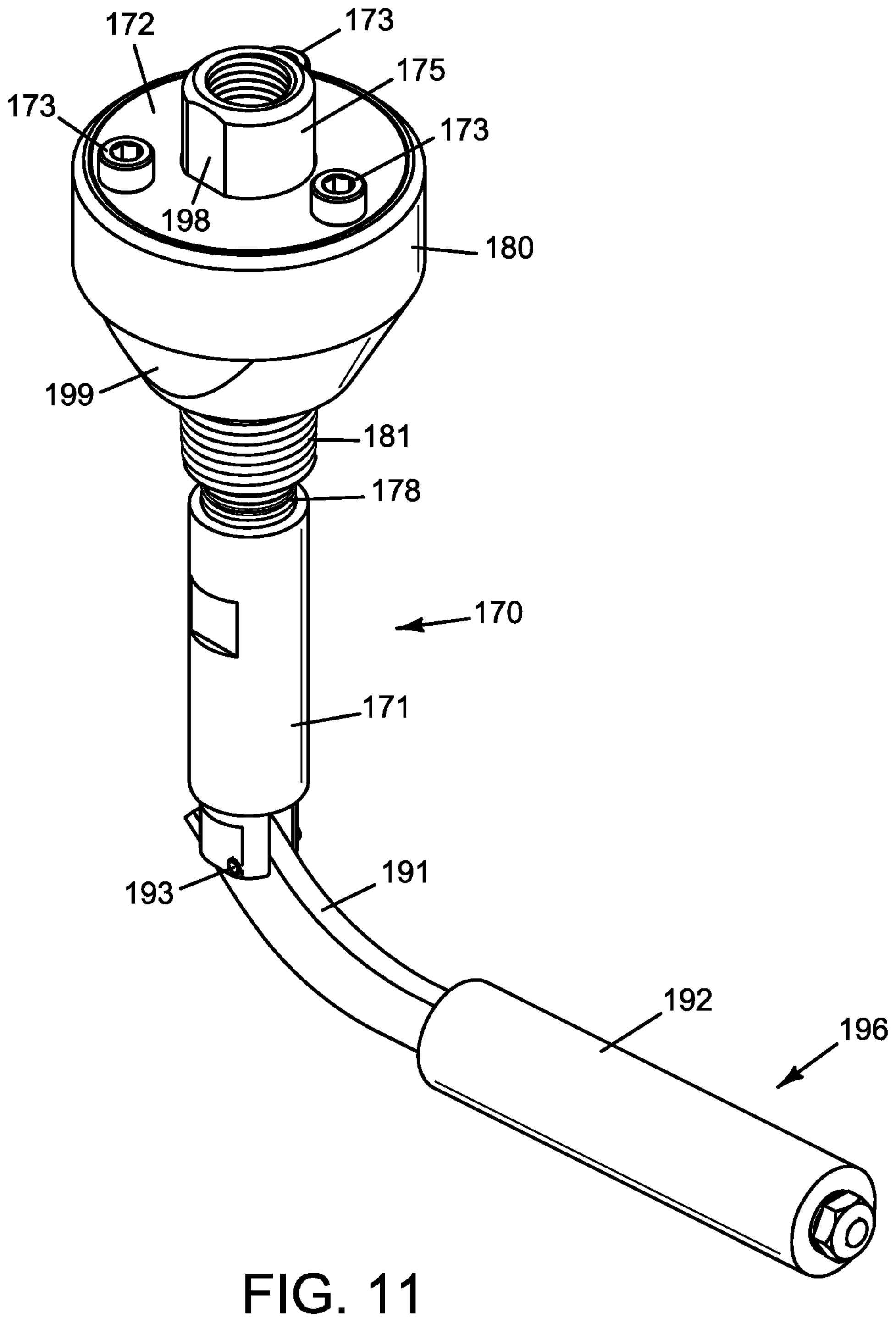
FIG. 11 is an upper, perspective view of the embodiment of FIG. 10.

As illustrated in FIGS. 4 and 6, the receptacle 32 of the fluid flow valve 20 fluidly connecting with a valve body 40. The valve body 40 comprising an upper portion 39 and a lower portion 41. It is preferred that the receptacle 32 be bolted to the valve body 40 via a number of bolts 29 at the upper portion 39. The opposite end of the upper portion 39 comprising an orifice defining a seat 42 configured for mating engagement with a beveled edge of the head of a piston. The internal space of the upper portion 39 defining a first chamber 36 therein.

The upper portion 39 preferably having external threading for allowing the valve body 40 to be screwed into a threaded hole within wall of the container (preferably the top wall of the container). In such an arrangement, the upper portion 39 is installed generally outside of the container. Other manners of mounting the body of the valve to the container are likewise possible. For instance, the utilization of a flange that is bolted onto the container.

The upper portion 39 also preferably having an upper fluid bleed passage 44' configured to fluidly align with a lower fluid bleed passage 44 of the lower portion 41. Preferably, an O-ring or other seal is used at such a connection for preventing leakage, such as a bleed passage O-ring 37. The upper fluid bleed passage 44' terminating at an upper port 45. This upper port 45 configured for connecting, such as via the supply line 190/190' of FIG. 16, to a float control module.

The lower portion 41 having a piston housing 46 configured for receiving a piston 50 therein. The piston housing 46 having an internal sidewall 47 defining an open topped cylinder in which the piston 50 is slidably received.

Extending from the piston housing 46 are a plurality of legs, preferably three legs (58, 58', 59), which include there-through holes for receiving bolts 28 used to bolt the lower portion 41 to the upper portion 39. The legs also define lateral fluid flow passages 61 there-between for allowing fluid passing through the fluid flow control valve 20 to be conveyed into the container (fuel tank). The lateral fluid flow passages 61 can be best be seen in FIG. 7 as being open, and in FIG. 5 as being almost closed (the piston's head 51 almost sealing against the seat 42 (sealing would effectively close them).

Preferably extending through one of the legs 59 is the lower fluid bleed passage 44 that is, as described above, configured to fluidly align with the upper fluid bleed passage 44' (best shown in FIGS. 4 and 6). The legs (58, 58', 59) terminating at a first end of the lower portion 41, and an end wall 49 preferably exists at generally the second end of the lower portion. Preferably, adjacent to the end wall 49 is a lower port 43 (shown in FIGS. 4 and 6) fluidly connected with the lower fluid bleed passage 44. This lower port 43 fluidly connected with the second chamber 38.

The piston 50 having a head 51, the head preferably being beveled 55. The beveled portion of the head configured for creating a mating seal against the seat 42. It is preferred that the piston 50 be hollow. The piston 50 having an external sidewall preferably containing a of pair concentric sidewall grooves (57, 57') configured for receiving at least one sealing member (52, 52') therein. The sealing members (e.g., O-rings, Teflon seals) sealing the piston external sidewall 56 to the housing internal sidewall 47.

In the preferred embodiment, no spring is needed for biasing the piston's beveled head against the seat 42 of the upper portion 39. The effective area of the piston is larger than the effective throat area of the receiver (tapered bore). No spring is needed for biasing the piston's beveled head against the seat of the upper portion because of this difference in areas and pressure. During fueling conditions, once the bleed passage (43/44/44') has been blocked, the area above the piston has high fluid velocity (low pressure) and the area below the piston has low fluid velocity (high pressure). The effective area of the throat of the receiver is smaller than the effective area of the piston. The net force (pressure multiplied by area) on the piston moves the piston upwards into the receiver, shutting off the flow. During no-flow conditions or when the system has shut down, the piston is engaged into the receiver. The pressures are equal on each side of the piston, as both fluid flows are zero. In order for the piston to still remain sealed the piston area must be greater than the throat area. The result is that a spring is not necessary for biasing the piston's beveled head against the seat of the upper portion.

Preferably, the head of the piston 50 has a bleed hole/passage 60 defined there-through, the bleed hole 60 interconnecting the first chamber 36 with the second chamber 38. Preferably, the bleed passage 60 is configured for receiving a piston jet 54 therein (preferably by threading), the piston jet 54 for allowing the diameter of the bleed passage 60 to be modified for testing purposes. Alternatively, no piston jet could be included, and desired flow could be created based upon the diameter of the bleed passage 60 itself.

Figure 2:
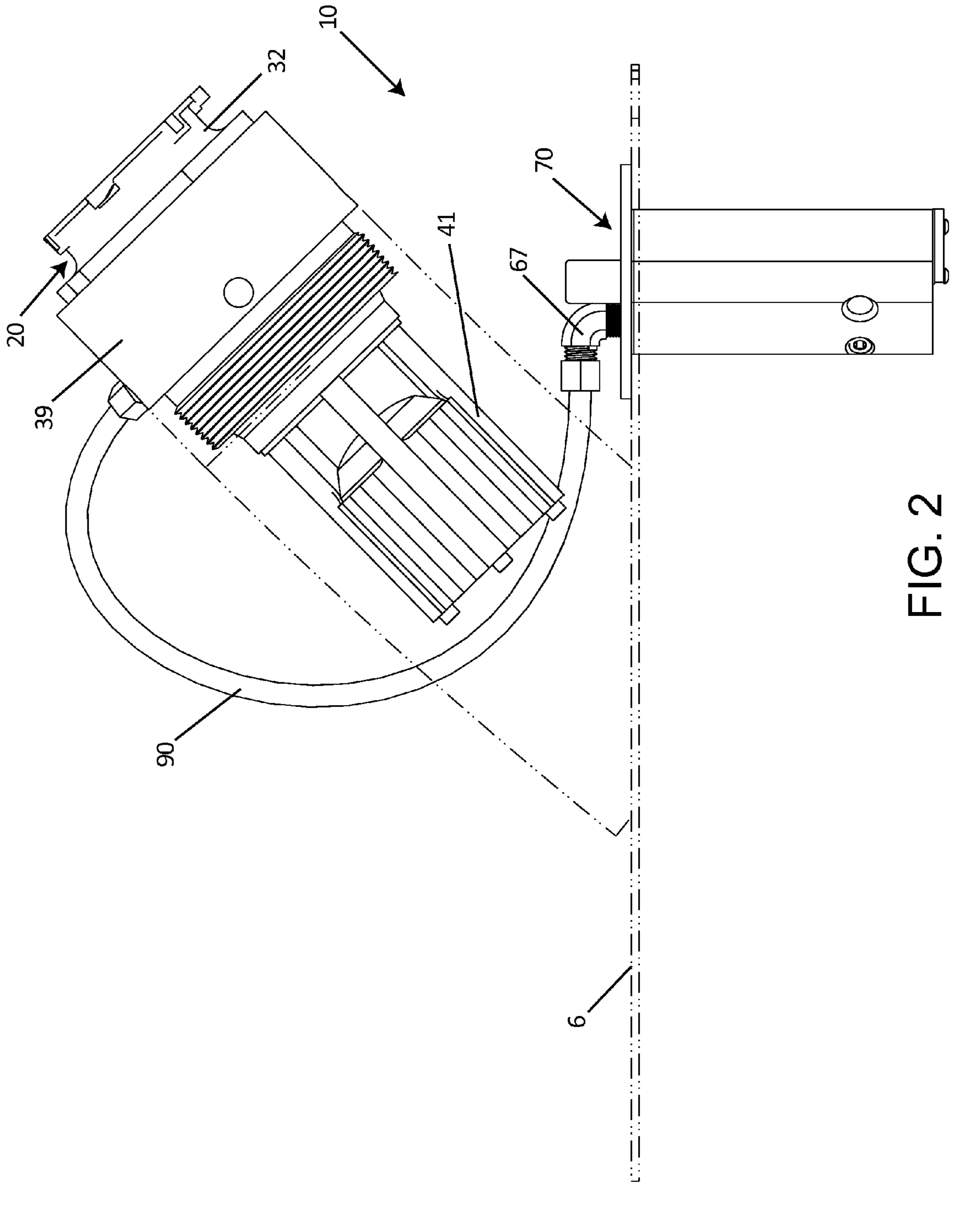
FIG. 2 is a first side view of the embodiment of FIG. 1.
Figure 3:
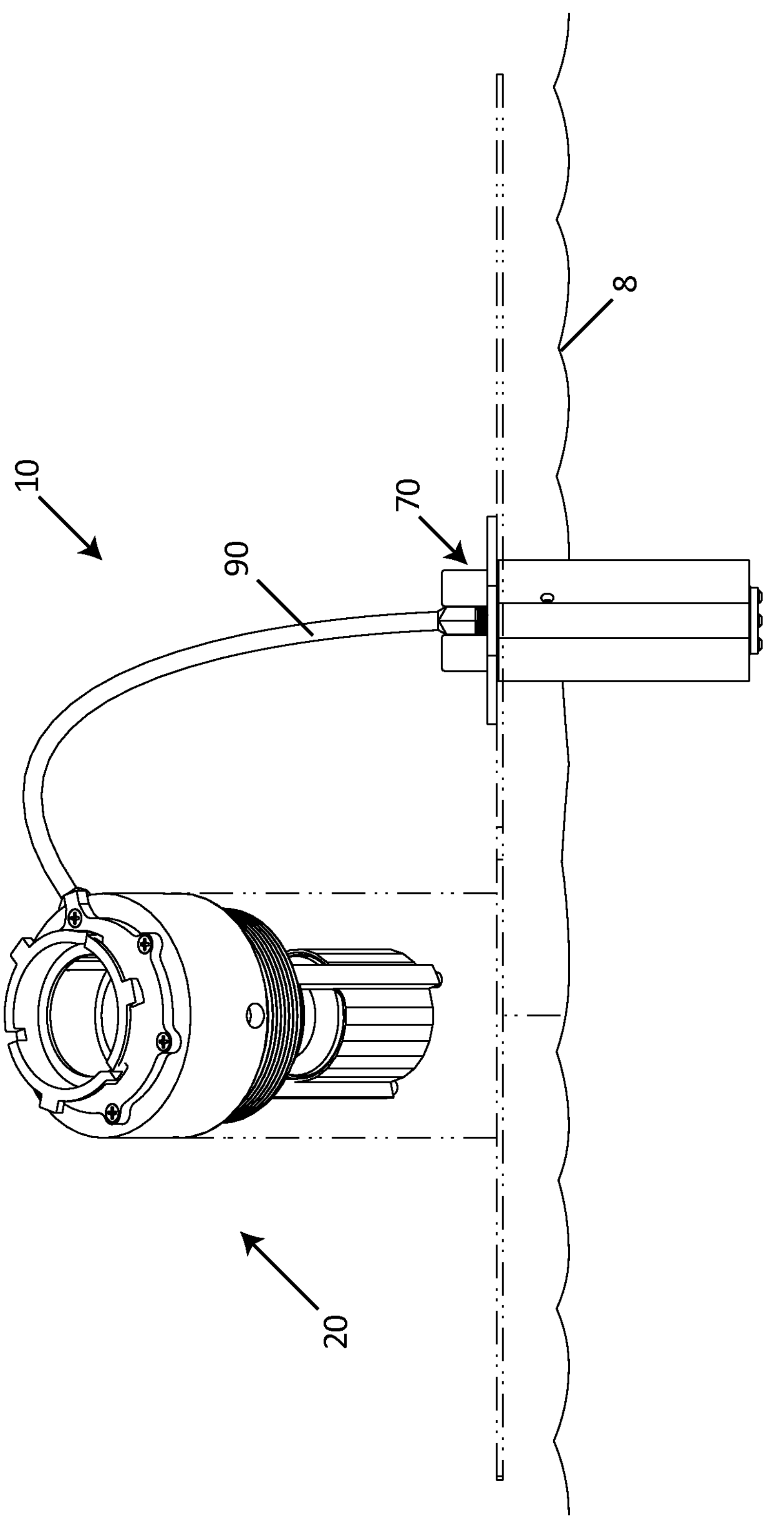
FIG. 3 is a side perspective view of the embodiment of FIG. 1.

The fluid flow control valve 20 is configured for use with a float valve. A generic float valve 70 is shown in FIGS. 1-3. A more specific embodiment is shown in FIGS. 10-16.

In the embodiment shown in FIGS. 1-3, the testing module and fluid level sensor module are combined together within the float control module 70. FIGS. 10-16 show a second embodiment of a float valve (float control module) 170. This embodiment of a float control module does not include an integral testing module, but instead the testing (if necessary) can be handled via a separate means, such as the test valve 150 shown in FIG. 16.

The float valve (float control module) 170 is configured for use with a refueling apparatus with an automatic stop, such as the fluid flow control valve module 20 shown in FIGS. 1-9, although it may be used separately or for other uses. Thus, the fluid flow control valve which, working in concert with a float valve 170, can be opened or closed, thereby shutting off a flow of fuel into a container (e.g., fuel tank). The preferred mechanism for doing so being the same as described above with respect to the embodiment of FIGS. 1-9. As in that embodiment, the container has an air space above a fluid space, and the surface of the fluid space defines a fluid level within said container.

Typically, a locomotive's fuel tank (container) will have a one-half inch (½") to three-quarter inch (¾") National Pipe Thread (NPT) port 300 (FIG. 12-13) through the side wall (typically the top wall) of the container 6. This port 300 is typically used as a vent tube and/or to connect the locomotive's fuel tank to the existing receiver using a flexible tube. The port 300 being internally threaded.

Referring specifically to FIGS. 10-13 and FIG. 15, the float control module 170 comprising a head 180, a central assembly 175, an extension 177, a body 171, and a float portion 196.

It is preferred that the body 171 comprises an upper portion 168 and a lower portion 169. The float portion 196 and the body 171 configured and sized (preferably less than ¾" in diameter) for insertion through the port 300 and into the container 6.

The head 180 having an externally threaded portion 181 having threads configured for threading into the NPT port's internal threads after the float portion 196 has been inserted therethrough, thereby attaching the float control module 170 to said fuel tank 6 with said float portion 196 extending into the container/fuel tank.

Figure 16:
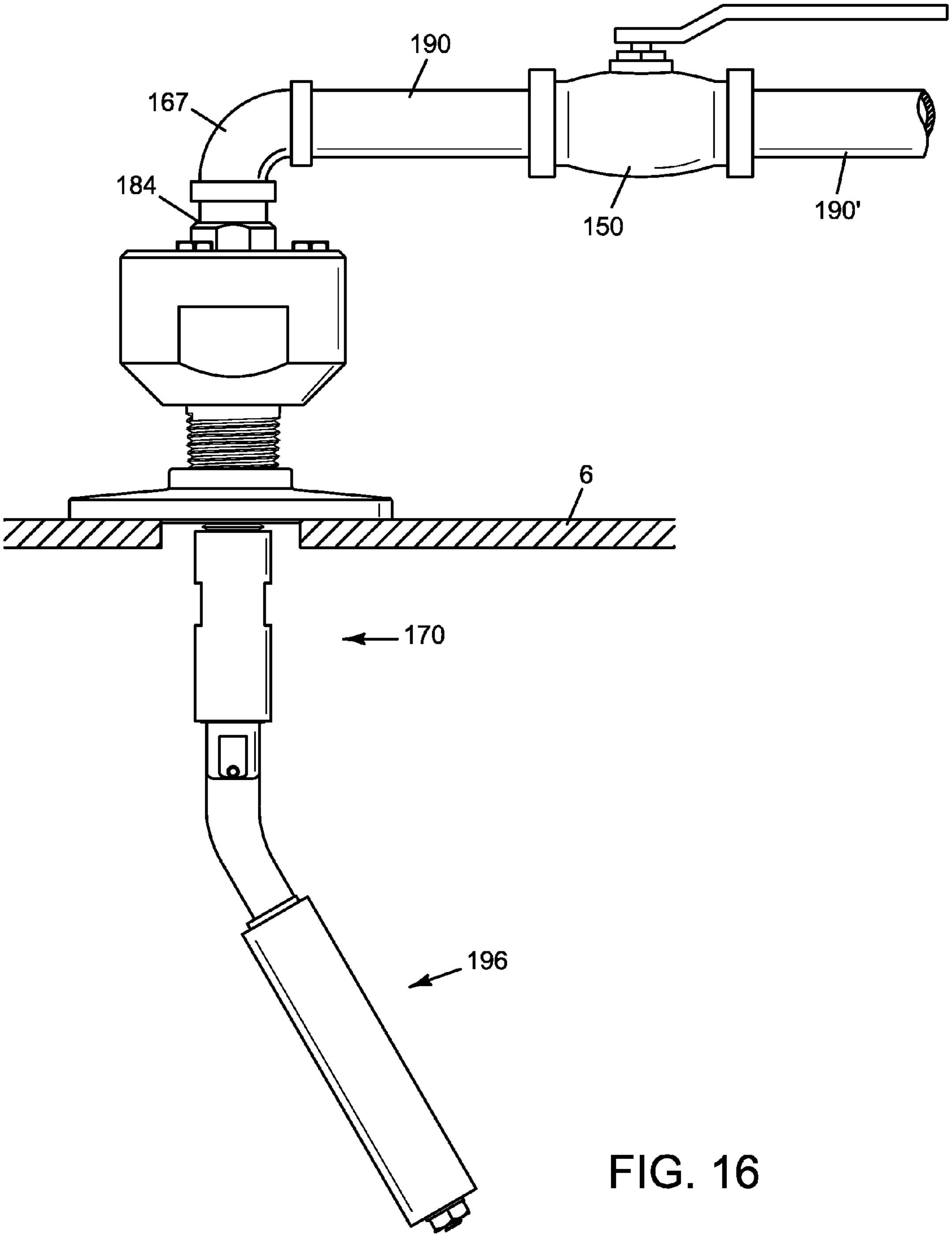
FIG. 16 is a cross-sectional view of the embodiment of FIG. 10 shown installed on a tank with connective tubing and a test valve assembly.

The central assembly 175 defining therein an inlet port 184 configured for receiving therein connection with a fitting/connector 167 (shown in FIG. 16). The inlet port 184 fluidly connecting with an inlet bore 182 which extends through the float control module from the inlet port 184 of the central assembly to an outlet 185 in said body 171. The inlet bore 182 comprising an upper inlet bore through the central assembly, a center inlet bore through the extension, and a lower inlet bore through the body. The fitting 167 fluidly connecting the fluid flow control valve module (not shown) with the float control module 170 via a conduit 190/190' so that when the float valve 170 (or the test valve 150 (shown in FIG. 16)) is closed, bleed flow from the conduit 190 through the inlet port 184 and out the outlet 185 (and fluidly into the tank) is terminated. As discussed above, blockage of the bleed results in the fluid flow control valve's piston having high fluid velocity (low pressure) above the piston and the area below the piston has low fluid velocity (high pressure). The effective area of the throat of the receiver is smaller than the effective area of the piston. The net force (pressure multiplied by area) on the piston moves the piston upwards into the receiver, shutting off the flow. The preferred test valve being a ball valve, although other types of valves are likewise suitable.

In the embodiment shown, the inlet port 184 is within the central assembly 175. The central assembly 175 having a drum, an inlet port, an upper inlet bore, and an outlet port. The drum is configured to be rotatably received in the housing of the head. The central assembly having an upper inlet bore defined there-through, preferably this upper inlet bore is threaded. The upper inlet bore extending from the inlet port to the outlet port. Preferably, the connection between the bleed line and the float control module comprises a connector inserted through the inlet port and threaded into the upper inlet bore, this connector connecting to the bleed line.

Depending upon the application, the length of the extension 177 could be varied. In the embodiment shown, the extension 177 comprising a pipe nipple, tube or other tubular member having a pair of threaded ends, a first end that threads into the central assembly and a second end that threads via threading (lower threads) 178 into the body 171 at a first end of the body 171. The extension defining a center inlet bore there-through. The first end configured for insertion into the outlet port of the central assembly and threaded engagement with the upper inlet bore of the central assembly. The second end configured for insertion into the receiver of the body and threaded engagement with the lower inlet bore of the body. The tubular member having a length. Varying lengths of tubular members could be utilized with embodiments of the inventive concept. It is preferred that the extension have a diameter of less than three-quarters of an inch, more preferably less than one-half of an inch.

The inlet bore 182 passes through the body 171, extending from the inlet port 184 in said upper portion 168 through the central assembly 175, extension 177 and body 171 to an outlet 185 in the lower portion 169 of the housing 171. The inlet bore comprising part of a fluid passageway extending between the fluid flow control valve module (not shown) through the conduit 190/190' through the float control module 170 and into the container.

It is preferred that the internal passages of the float valve are sized proportional to the internal passages of the fluid flow control module and the test valve to ensure minimum pressure drop across the fluid bleed stream, thereby ensuring that the bleed stream incurs minimal pressure drop from the time it passes through the piston jet until it exits the float valve. An unintended pressure drop can be caused if any of these passages are smaller in diameter than the fluid bleed passage coming out of the fluid flow control valve. If this pressure drop is significant enough, it would simulate the float valve being closed and would cause pressure to equalize across the face of the piston thereby shutting down the flow of fuel. Thus, providing for all internal passages to be sized proportional to each other, the likelihood of such a pressure drop will be greatly reduced, if not completely eliminated. The head 180 configured for rotatably receiving the drum of the central assembly 175 therein, preferably within a housing 174.

The central assembly 175 preferably having a threaded passageway (the upper inlet bore) defined there-through. Alternatively, only a portion of said passageway could be threaded. This threading preferably including the inlet port 184 on one end of the central assembly 175 and extending to a second end (outlet port) configured for receiving therein a first end of the extension 177. The central assembly 175 having a channel defined therein for receiving an o-ring 176 thereby sealing the drum against the housing. In such an arrangement, the central assembly-extension are able to rotate relative to the head 180, for instance (as particularly shown in FIGS. 10 and 11) through manipulation of the central assembly via a wrench engaging the central assembly at wrench flats 198 relative to the head 180 (which could be held in place via a second wrench engaging the head at wrench flats 199).

Once the central assembly is positioned as desired, a rotation lock is used to lock the central assembly. In one example, the rotation lock comprises a top plate 172 slid over the central assembly in conjunction with at least one bolt 173 used to lock the top plate in place. This prevents the central assembly from rotating further. The preferred top plate (top locking flange) shaped to fit over the top of the central assembly, with flanges for engaging the wrench flat(s), thereby allowing rotation to be prevented.

The body (valve assembly) comprising an upper portion comprising a receiver, a lower portion, an upper portion, a lower inlet bore and a valve. The lower portion connecting to said upper portion. The lower portion comprising an outlet fluidly connected to the fuel tank. The lower inlet bore extending through the body from the receiver to the outlet.

Figure 15:
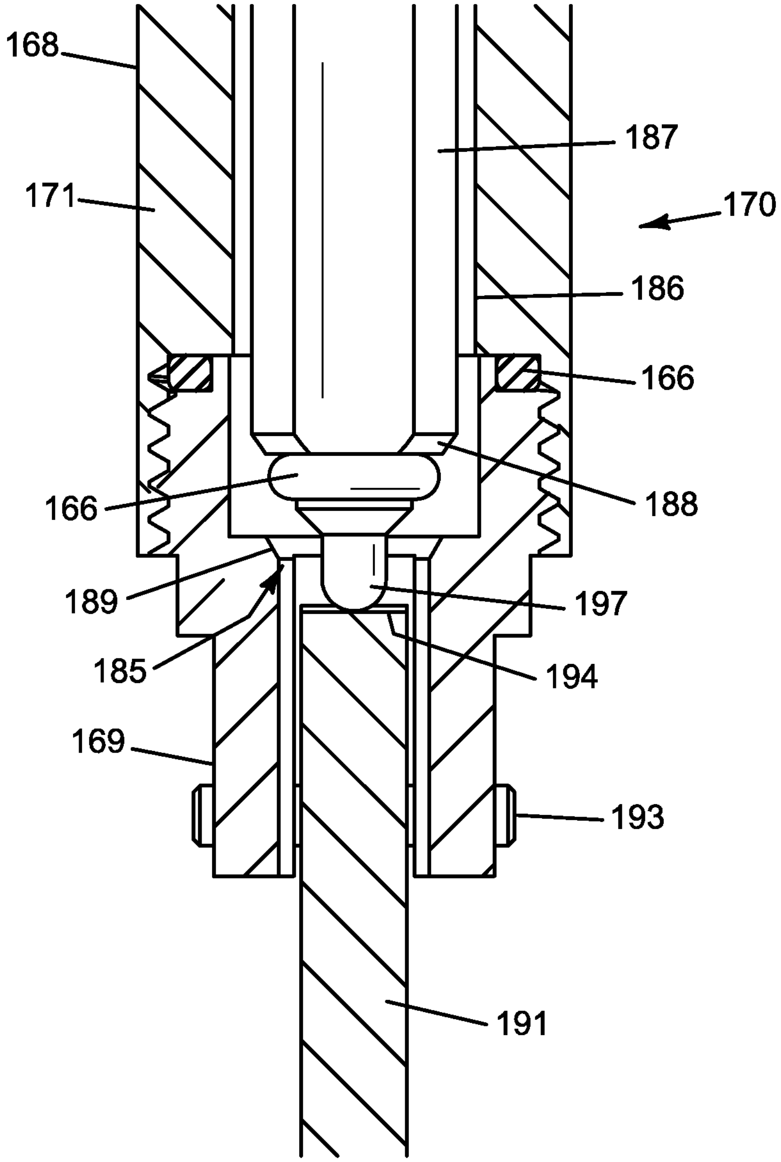
FIG. 15 is a partial, cross-sectional rotated view of the embodiment of FIG. 10.

As shown in FIG. 15, the body 171 defining a cylinder portion 186 through which the inlet bore 182 extends (as the lower inlet bore). The body comprising a valve, said valve comprising the cylinder 186 sized for receiving a piston 187. The piston 187 having a base portion 188 configured for sealing engagement with a seat 189 adjacent the outlet 185. The valve having an open position where bleed fluid may flow from the bleed line through the float control module and into the fuel tank. The valve having a closed position where bleed fluid is prevented from flowing through the float control module.

Figure 13:
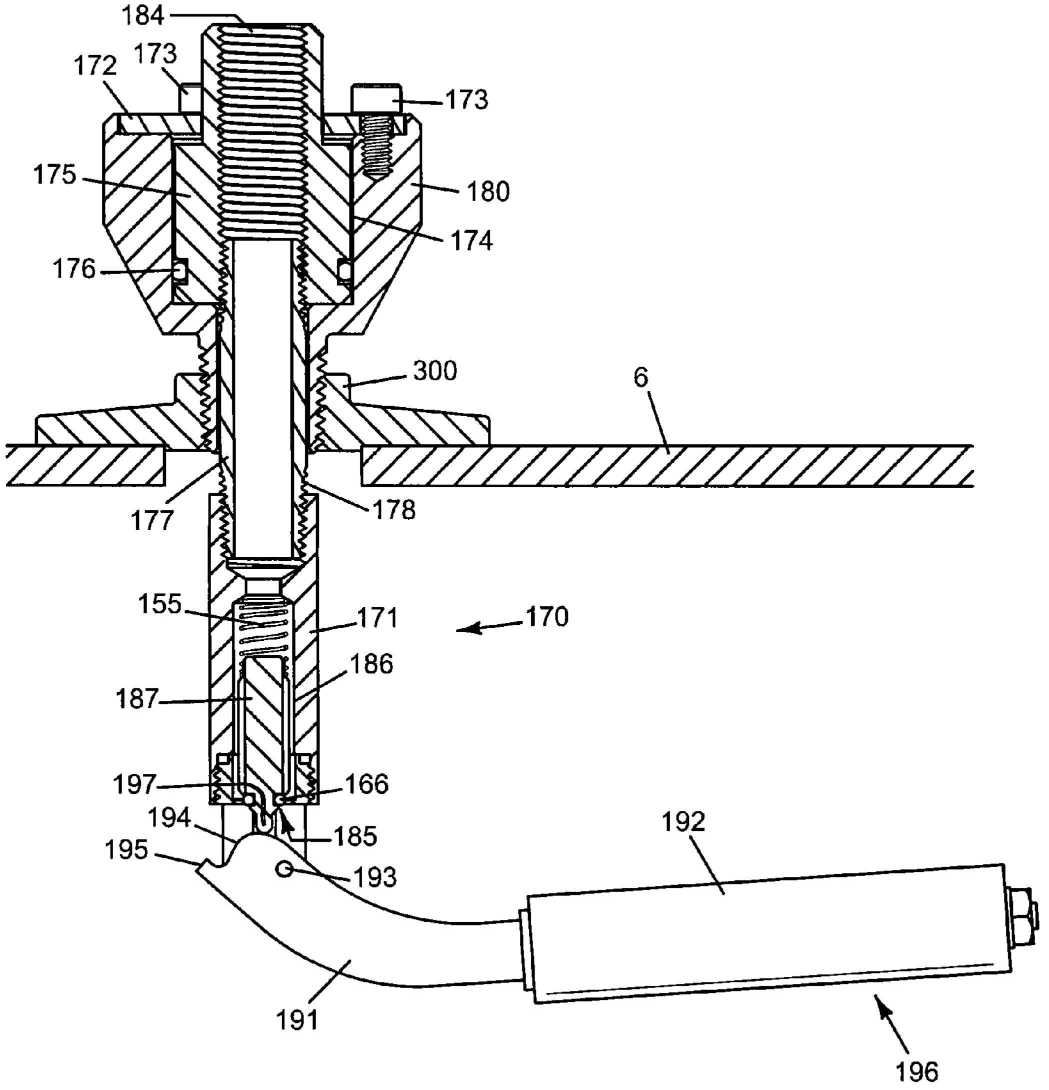
FIG. 13 is a side, cross-sectional view of the embodiment of FIG. 10 shown installed in a container in the float valve's closed position.

Preferably, the piston is spring biased in the closed position via spring 155 (shown in FIG. 13). The piston having a boss 197 configured for extending through the outlet 185, the boss 197 configured for manipulation by the cam member 194 of the float portion's arm 191. It is preferred that the body has a diameter of less than three-quarters of an inch, more preferably less than one-half of an inch.

The float portion 196 having a float 192 and a float arm 191. The float portion 196 pivotally connecting to the lower portion 169 of the body 171 via a pivot pin 193. Rotation of the float portion 196 at the pivot pin 193 resulting in the cam member 194 variably contacting the boss 197 of the piston. Preferably, the connection between the lower portion 169 and the body 171 sealed via an O-ring 166, as shown in FIG. 15. It is preferred that the float portion have a diameter of less than three-quarters of an inch, more preferably less than one-half of an inch.

Figure 12:
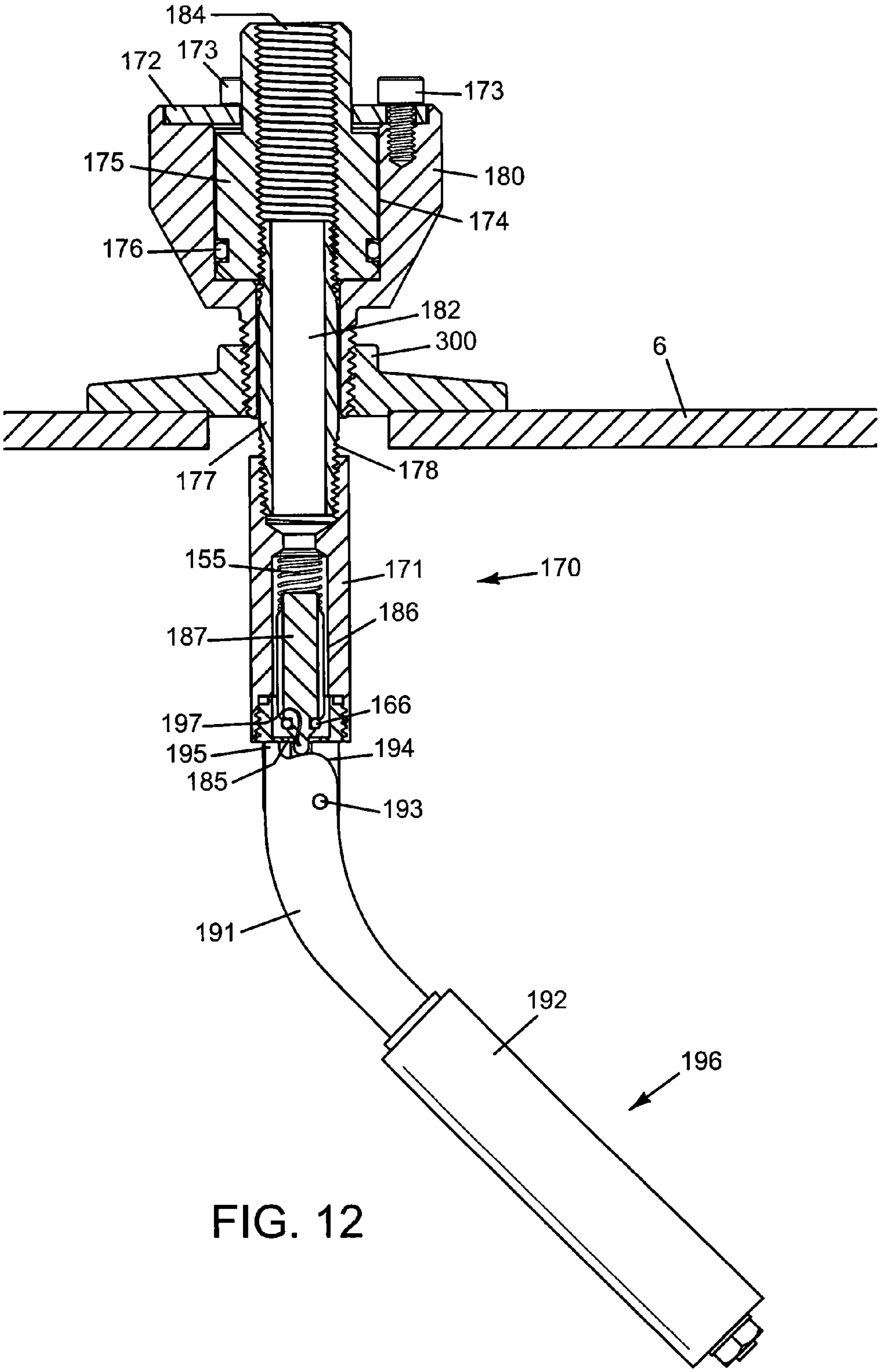
FIG. 12 is a side, cross-sectional view of the embodiment of FIG. 10 shown installed in a container in the float valve's open position.

FIG. 12 showing the position of the float portion 196 when the fuel tank is in a non-filled state. In that position, it is preferred that a stop 195 limits further rotation of the float portion 196 around the pivot pin 193. The weight of the float portion 196 coupled with the bias of the spring causing this filling state to be entered into. In this state, the cam member 194 presses the boss 197 upwards, towards the head 180, thereby removing the lower plug portion's base 188 from engagement with the body's seat 189, thereby opening the bleed passageway from between the fluid flow control valve module 20 through the conduit 190, through the float control module 170, through the inlet port 184 and inlet bore 182, through the body 171, and into the container (fuel tank).

FIG. 13 showing as the fuel level in the container rises, the float 192 floats, causing the float arm 191 to rotate at the pivot pin 193 resulting in rotation of the cam member 194. As the cam member 194 rotates, the float portion 196 moves towards its non-filling state and the boss 197 is able to descend away from the head 180, the lower plug portion's base 188 coming into sealing engagement with the body's seat 189, thereby closing the bleed passageway between the fluid flow control valve module 20 through the conduit 190 through the float control module 170 (through the inlet port 184 and inlet bore 182, through the body 171) and into the container (fuel tank). Closing the bleed passageway, as discussed above, has the effect of causing the pressure differential needed to close the receiver piston and stop fuel flowing through the system.

In that locomotive fuel tanks typically contain a number of internal baffles designed to limit fuel movement within the tank, in order to ensure that the float does not contact the baffles, it is preferred that the float mechanism (arm and valve body) be adjustable during the installation process to allow rotation of the float to a position that ensures no interference with the internal baffles will occur. Upon proper orientation, the float mechanism is then locked into place, preferably through use of a set screw.

FIG. 16 shows a second embodiment of a testing module. Again, in the embodiment shown in FIGS. 1-3, the testing module and fluid level sensor module are combined together within the float control module 70. The embodiment of FIG. 16 showing a testing module that is not part of, or integral to, a fluid level sensor module. As discussed above, it is preferred that the testing module comprises a bleed flow interrupter 150 for interrupting the flow of a bleed fluid through said conduit. The bleed flow interrupter could comprise a valve, preferably a ball valve, located along the conduit (190, 190'). In such an embodiment, the bleed flow interrupter is able to be manually closed and opened by an operator. Closing the valve blocks the bleed passageway from between the fluid flow control valve module through the conduit, through the float control module, and into the container (fuel tank), causing the pressure differential needed to close the receiver piston and stop fuel flowing through the system. In such a configuration, the bleed flow interrupter can be used to test whether the shut off mechanism of the fluid flow control valve is operating, but does not per se test the function or operation of the float module/fluid level sensor itself.

The bleed flow interrupter could also comprise an emergency stop button that would function in a similar manner as a traditional "E-stop button." In such a configuration, the operator would depress the "Stop" button and the Stop button would lock in the closed position, stopping the flow of fluid through the fluid flow control valve, and cause the piston to close and stop fuel flow. In order to restart the flow, the operator would need to release the button by twisting or pulling to open the valve and enable flow to continue.

The bleed conduit 190/190' preferably attaches in between the upper port 45 (shown in FIGS. 4 and 6) of the fluid flow control valve 20 and the inlet port 184 of the float control module 170. This bleed conduit 190/190' for fluidly interconnecting the two components and allowing the float control module 170 to automatically close the fluid flow control valve 20 upon a predetermined level of fluid in the container being reached (for instance, the fluid level 8 shown in FIG. 3). The bleed conduit 190/190' connecting to the float control module at an inlet port 84. The preferred bleed conduit 190/190' being twenty-four (24) inches long, however other lengths may be utilized, particularly dependent upon the distance apart the float control module and fluid flow control valve are located. In FIG. 16, a fitting 167 is utilized to make the connection between the conduit 190 and the inlet port 184.

Referring particularly to FIGS. 12 and 13, the shut down mechanism (control module 170) has been designed to fit within the existing infrastructure of the locomotive industry. Specifically, the float arm 191 and valve body 171 have been sized to fit within a port 300 that commonly exists on many locomotive fuel tanks. This port is currently used as a vent line for the existing fueling system. The float design allows for provisions to shut off at different fuel levels (based on preferences).

The shut off level is determined by the length of the extension 177 that connects the valve body 171 to the central assembly 175. To maximize the level within the tank, the shortest possible extension should be installed to raise the float arm and valve body as much as possible. If the railroad wishes to "short fill" the locomotives on a regular basis, a longer extension can be installed so that the level of the float arm and valve body is placed in a position where it activated at the desired "short fill" level.

Figure 14:
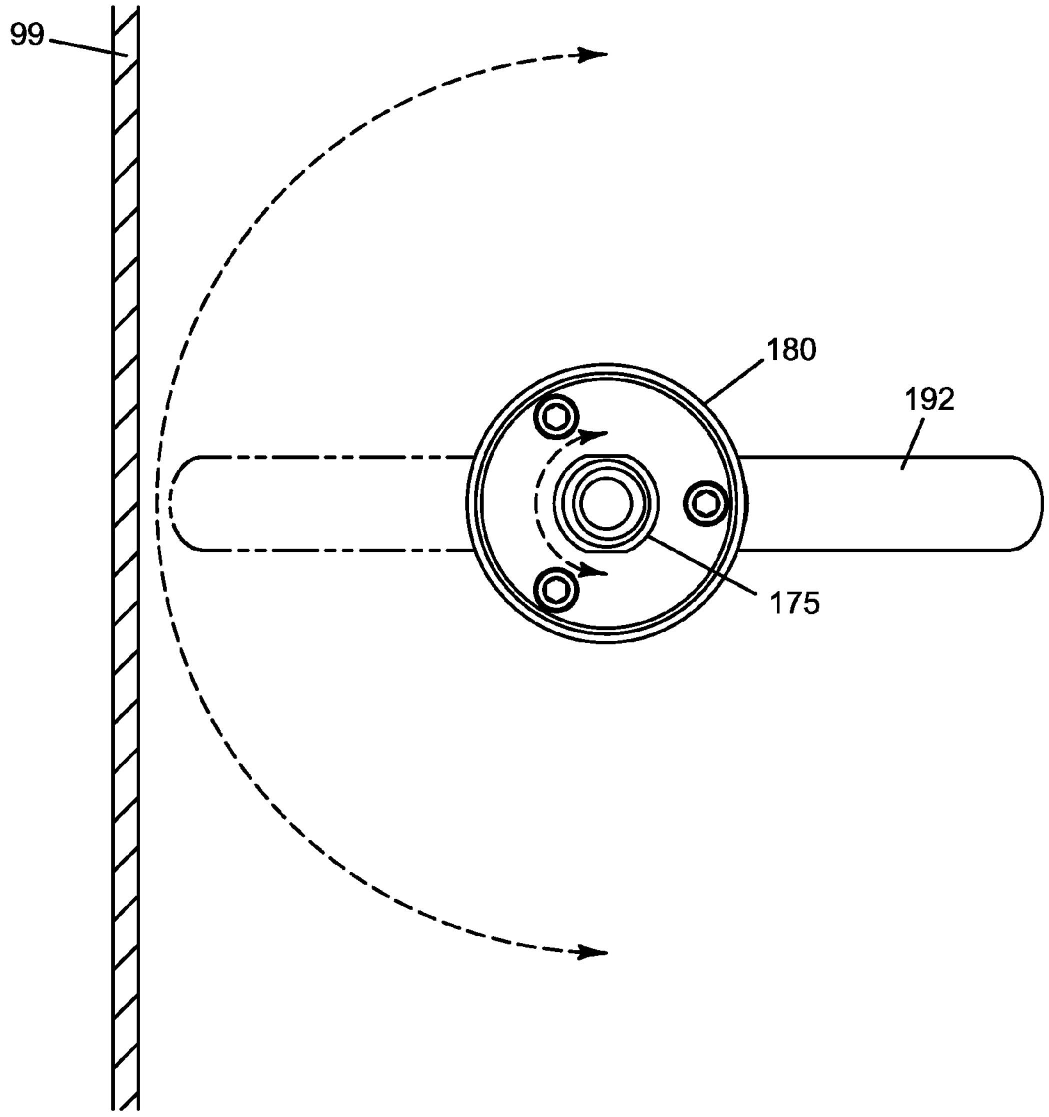
FIG. 14 is a top side, cross-sectional view of the embodiment of FIG. 10 shown installed in a container, showing an internal baffle of the container.

In addition to being able to adjust the fill level of the tank, the float arm can be oriented independently from the external body mount, as shown in FIG. 14. The value of this is when the port is located in close proximity to the sidewalls or an internal baffle 99 of the tank, the float arm, valve body and orientation collar can be rotated (as described above) and positioned so that interference with the sidewall or baffle does not occur. Once the body mount is threaded into the tank and the attachment collar oriented, the locking top plate 172 is installed over the attachment collar securing it to the external body.

First Example Embodiment. A refueling apparatus for use in refilling a container with a fluid, said refueling apparatus comprising: a fluid flow control valve module, said fluid flow control valve module having a fluid passage there-through for connection with a fluid source, said fluid flow control valve module having a shutoff valve, wherein said fluid is able to travel from said fluid source through said fluid flow control valve module and into said container when said shutoff valve is open, and wherein when said shutoff valve is closed said fluid is prevented from flowing through said fluid flow control valve module, wherein said fluid level sensor is able to control the opening and closing of said shutoff valve; said fluid level sensor module having a sensor configured sensing the level of fluid in said container, said fluid level sensor module configured for closing said fluid flow control valve module upon said sensor sensing that said fluid level is higher than a predetermined level in said container and opening said fluid flow control valve module upon said sensor sensing that said fluid level is lower than a predetermined level in said container; and a testing module, wherein said testing module comprises means for simulating a predetermined fill level in said container thereby allowing the function of the fluid level sensor module to be tested.

Second Example Embodiment. A refueling apparatus for use in refilling a container with a fluid, said container having air space above a fluid space, said fluid having a fluid level within said container, said refueling apparatus comprising: a fluid flow control valve, said fluid flow control valve connecting with a fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said upper portion comprising an orifice defining a tapered seat configured for mating engagement with a beveled edge of the head of a piston, wherein the internal space of the upper portion defines a first chamber, said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said at least one lateral fluid flow passage for allowing fluid passing through the fluid flow control valve to be conveyed into the container, wherein said piston's head sealing against the seat closes said at least one lateral fluid flow passage, said lower portion comprising a lower port interconnecting said second chamber with a bleed passage terminating at an upper port, said upper port configured for connecting with a supply line connecting with a float control module at an inlet port, said piston having said head with said beveled edge, said edge configured for creating a mating seal against said tapered seat, said piston having an external sidewall having at least one sidewall groove configured for receiving at least one sealing member therein for slidably sealing the piston's external sidewall to the housing's internal sidewall, wherein the said head further comprising a bleed hole defined there-through, said bleed hole interconnecting the first chamber with the second chamber; a float control module, said float control module comprising said inlet port, said inlet port interconnected with an outlet port in said float control module, wherein when the fluid level is below a preset level in said container, the float control module allows the flow of fluid through said inlet port to said outlet port, and wherein when the fluid level is above a preset level in said container, the float control module blocks the flow of fluid through said inlet port to said outlet port causing a fluid pressure difference between the first chamber and the second chamber which moves the piston away from said seat, allowing the fluid to flow from the fluid source, through the fluid flow control valve, out said lateral fluid flow passage, and into said container.

Third Example Embodiment. A refueling apparatus for use in refilling a container with a fluid, said container having air space above a fluid space, said fluid having a fluid level within said container, said refueling apparatus comprising: a fluid flow control valve, said fluid flow control valve connecting with a fluid source containing fluid, wherein said fluid is able to travel from said fluid source through said fluid flow control valve and into said container when said fluid flow control valve is open, and wherein when said fluid flow control valve is closed said fluid is prevented from flowing through said fluid flow control valve, said fluid flow control valve comprising a valve body, said valve body comprising an upper portion and a lower portion, said upper portion comprising an orifice defining a tapered seat configured for mating engagement with a beveled edge of the head of a piston, wherein the internal space of the upper portion defines a first chamber, said lower portion having a piston housing configured for receiving said piston therein, said piston housing having an internal sidewall defining an open topped cylinder having an end wall, the piston slidably received within said cylinder, the space within the cylinder between the end wall and the piston defining a second chamber, wherein at least one lateral fluid flow passage is defined in said internal sidewall, said at least one lateral fluid flow passage for allowing fluid passing through the fluid flow control valve to be conveyed into the container, wherein said piston's head sealing against the seat closes said at least one lateral fluid flow passage, said lower portion comprising a lower port interconnecting said second chamber with a bleed passage terminating at an upper port, said upper port configured for connecting with a supply line connecting with a float control module at an inlet port, said piston having said head with said beveled edge, said edge configured for creating a mating seal against said tapered seat, said piston having an external sidewall having at least one sidewall groove configured for receiving at least one sealing member therein for slidably sealing the piston's external sidewall to the housing's internal sidewall, wherein the said head further comprising a bleed hole defined there-through, said bleed hole interconnecting the first chamber with the second chamber; a float control module, said float control module comprising said inlet port, said inlet port interconnected with an outlet port in said float control module, wherein when the fluid level is below a preset level in said container, the float control module allows the flow of fluid through said inlet port to said outlet port, and wherein when the fluid level is above a preset level in said container, the float control module blocks the flow of fluid through said inlet port to said outlet port causing a fluid pressure difference between the first chamber and the second chamber which moves the piston away from said seat, allowing the fluid to flow from the fluid source, through the fluid flow control valve, out said lateral fluid flow passage, and into said container; and a testing module, wherein said testing module comprises means blocking said fluid passage from the supply line through said inlet port and out said outlet port thereby simulating a predetermined fill level in said container and allowing the function of the float control module to be tested.

Fourth Example Embodiment. A refueling system for a vehicle having a fuel tank, said fuel tank having a side wall having an internally threaded port defined therein. The refueling system comprising a fluid flow control valve, a bleed line, and a float control module.

The fluid flow control valve for controlling the flow of fuel from a fuel source into said fuel tank, said fluid flow control valve connecting to a bleed line. The bleed line interconnecting said fluid flow control valve and a float control module.

The float control module connecting to said bleed line, said float control module comprising: a head, a central assembly, an extension, a body, a float portion, and a rotation lock. The head comprising: an externally threaded portion having threading configured for threading into said port's internal threads, and a housing, said housing configured for rotatably receiving a drum of a central assembly therein. The central assembly comprising: a drum rotatably received in said housing, an inlet port, an upper inlet bore defined through said central assembly, said upper inlet bore extending from said inlet port to an outlet port, said upper inlet bore having threading configured for receiving a threaded extension first end, and said outlet port. Preferably, the drum defines a channel, said channel containing an O-ring for sealing engagement with said housing.

The central assembly comprises a connector inserted through said inlet port and threaded into said upper inlet bore, said connector connecting to said bleed line. The extension comprising: a tubular member having threaded ends, namely said first end and a second end, said tubular member defining a center inlet bore there-through, said first end configured for insertion through said outlet port and into threaded engagement with said upper inlet bore, said second end configured for insertion into a receiver and into threaded engagement with a lower inlet bore. The body comprising: an upper portion, said upper portion defining said receiver, a lower portion connecting to said upper portion, said lower portion comprising an outlet, said outlet fluidly connected to said fuel tank, a lower inlet bore extending through said body from said receiver to said outlet, a valve, said valve comprising a cylinder portion within said lower inlet bore, said cylinder sized for receiving a piston, said piston having a base portion configured for sealing engagement with a seat adjacent said outlet, said piston biased in the closed position via spring, said piston having a boss extending through said outlet, said boss configured for manipulation by a cam member of a float portion's arm, said valve having an open position where bleed fluid may flow from said bleed line through said float control module and into said fuel tank, said valve having a closed position where bleed fluid is prevented from flowing through said float control module, said open and closed positions controlled by the raising and lowering of a float portion.

The float portion comprising a float arm, a float and a pivot pin, said float arm comprising said cam member, said float attaching to said float arm, and said pivot pin pivotally connecting said float portion to said lower portion, wherein rotation of said float portion at said pivot pin causing said cam member to variably contact said boss of said piston, opening and closing said valve. The rotation lock for preventing the rotation of said central assembly within said head, said rotation lock comprising a top plate and at least one bolt, said top plate configured for engaging said central assembly, said bolt configured for fixing said top plate in engagement with said central assembly.

Preferably, the port has an inside diameter of three-quarters of an inch or less and that said float portion, said extension, and said body have a diameter smaller than said port inside diameter, thereby enabling said float portion, said extension and said body to be inserted through said port and into said fuel tank. Preferably, when said valve is open, fuel can flow from said fluid flow control valve through said bleed line through said float control module and into said fuel tank, and the fluid flow control valve to open, thereby permitting a flow of fuel from said fuel source through said fluid flow control valve and into said fuel tank; and wherein when said valve is closed, the flow of fuel through said bleed line stops, causing the fluid flow control valve to close, thereby preventing fuel from flowing from said fuel source through said fluid flow control valve into said fuel tank. Preferably, a bleed flow interrupter is located inline of said bleed line, said bleed flow interrupter able to interrupt said bleed flow thereby allowing an operator to test said fluid flow control valve, wherein when said bleed flow is interrupted the flow of fuel through said bleed line stops, causing the fluid flow control valve to close, thereby preventing fuel from flowing from said fuel source through said fluid flow control valve into said fuel tank.

Fifth Example Embodiment. A refueling system for a vehicle, said refueling system comprising a fuel tank, a fluid flow control valve, a bleed line and a float valve. The fuel tank having a side wall, said fuel tank having an internally threaded port through said side wall, said port having an inside diameter of three-quarters of an inch or less. The fluid flow control valve configured for connection with a fuel source, said fluid flow control valve connecting to a bleed line, wherein stopping the flow of the bleed through the bleed line triggers the fluid flow control valve to close, thereby preventing a flow of fuel from said fuel source from flowing through said fluid flow control valve into said fuel tank, and wherein flow of the bleed the bleed line triggers the fluid flow control valve to open, thereby permitting a flow of fuel from said fuel source through said fluid flow control valve and into said fuel tank. The bleed line interconnecting said fluid flow control valve and a float valve.

The float valve connecting to said bleed line, said float valve having an open position where bleed fluid may flow from said bleed line through said float valve and into said fuel tank, said float valve having a closed position where bleed fluid is prevented from flowing through said float valve, said open and closed positions controlled by the raising and lowering of a float portion, said float valve comprising an externally threaded portion having threading configured for threading into the port's internal threads, a valve assembly having a diameter smaller than said port inside diameter, and a float portion having a diameter smaller than said port inside diameter, thereby enabling said valve assembly and said float portion to be inserted through said port and into said fuel tank.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s), which is measured by the claims, nor is it intended to be limiting as to the scope of the inventive concept(s) in any way.

Still other features and advantages of the claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred and example embodiments are to be regarded as illustrative in nature, and not as restrictive in nature.

While there is shown and described the present preferred embodiment(s) of the inventive concept(s), it is to be distinctly understood that this inventive concept(s) is not limited thereto but may be variously embodied to practice within the scope of the following claims. From the foregoing description, it will be apparent that various changes may be made without departing from the spirit and scope of the inventive concept(s) as defined by the following claims.

I claim:

1. A refueling system for a vehicle, said refueling system comprising:

a fuel tank, said fuel tank having a side wall, said fuel tank having an internally threaded port through said side wall, said port having an inside diameter of three-quarters of an inch or less;

a fluid flow control valve configured for connection with a fuel source, said fluid flow control valve connecting to a bleed line;

said bleed line interconnecting said fluid flow control valve and a float control module;

said float control module connecting to said bleed line, said float control module having an open position where bleed fluid may flow from said bleed line through said float control module and into said fuel tank, said float control module having a closed position where bleed fluid is prevented from flowing through said float control module, said open and closed positions controlled by the raising and lowering of a float portion, said float control module comprising: an externally threaded portion having threading configured for threading into the port's internal threads, said externally threaded portion comprising a housing configured for rotatably receiving a drum of a central assembly therein, said central assembly comprising said drum rotatably received in said housing, an inlet port, an upper inlet bore defined through said central assembly, said upper inlet bore extending from said inlet port to an outlet port, and said outlet port, said outlet port fluidly connecting to a valve assembly, said valve assembly having a diameter smaller than said port inside diameter, said valve assembly for interrupting the flow of said bleed fluid through said float control module, and a float portion having a diameter smaller than said port inside diameter, thereby enabling said valve assembly and said float portion to be inserted through said port and into said fuel tank;

wherein in said open position the flow of the bleed fluid through the bleed line is prevented, triggering the control valve to close, thereby preventing a flow of fuel from said fuel source from flowing through said fluid flow control valve into said fuel tank; and wherein in said closed position the flow of the bleed fluid through the bleed line is permitted, thereby triggering the control valve to open and permitting a flow of fuel from said fuel source through said fluid flow control valve and into said fuel tank.

2. The refueling system of claim 1, further comprising a rotation lock for preventing the rotation of said central assembly within said housing.

3. A refueling system for a vehicle having a fuel tank, said fuel tank having a side wall having an internally threaded port defined therein, said refueling system comprising:

a fluid flow control valve for controlling the flow of fuel from a fuel source into said fuel tank, said fluid flow control valve connecting to a bleed line;

said bleed line interconnecting said fluid flow control valve and a float control module; and said float control module connecting to said bleed line, said float control module comprising:

a head, wherein said head comprises: an externally threaded portion having threading configured for threading into said port's internal threads, and a housing, wherein said housing is configured for rotatably receiving a drum of a central assembly therein;

said central assembly comprising: said drum rotatably received in said housing, an inlet port, an upper inlet bore defined through said central assembly, said upper inlet bore extending from said inlet port to an outlet port, said upper inlet bore having threading configured for receiving a threaded extension first end, and said outlet port;

said extension comprising: a tubular member having threaded ends, namely said first end and a second end, said tubular member defining a center inlet bore there-through, said first end configured for insertion through said outlet port and into threaded engagement with said upper inlet bore, said second end configured for insertion into a receiver and into threaded engagement with a lower inlet bore;

a body comprising: an upper portion, said upper portion defining said receiver, a lower portion connecting to said upper portion, said lower portion comprising an outlet, said outlet fluidly connected to said fuel tank, a lower inlet bore extending through said body from said receiver to said outlet, a valve, wherein said valve comprises an open position where bleed fluid may flow from said bleed line through said float control module and into said fuel tank, said valve having a closed position where bleed fluid is prevented from flowing through said float control module, said open and closed positions controlled by the raising and lowering of a float portion;

said float portion comprising a float; and a rotation lock for preventing the rotation of said central assembly within said head.

4. The refueling system of claim 3, wherein said drum defines a channel, said channel containing an o-ring for sealing engagement with said housing.

5. The refueling system of claim 3, wherein said central assembly comprises a connector inserted through said inlet port and threaded into said upper inlet bore, said connector connecting to said bleed line.

6. The refueling system of claim 3, wherein said valve comprises a cylinder portion within said lower inlet bore, said cylinder sized for receiving a piston, said piston having a base portion configured for sealing engagement with a seat adjacent said outlet, said piston biased in the closed position via a spring, said piston having a boss extending through said outlet, and said boss configured for manipulation by a cam member of a float portion's arm.

7. The refueling system of claim 6, wherein said float portion comprising a float arm, said float arm comprising said cam member, said float attaching to said float arm; and a pivot pin pivotally connecting said float portion to said lower portion, wherein rotation of said float portion at said pivot pin causing said cam member to variably contact said boss of said piston, opening and closing said valve.

8. The refueling system of claim 3, wherein said rotation lock comprises a top plate, wherein said top plate is configured for engaging said central assembly, and at least one bolt, wherein said bolt is configured for fixing said top plate in engagement with said central assembly.

9. The refueling system of claim 3, wherein when said valve is open, fuel can flow from said fluid flow control valve through said bleed line through said float control module and into said fuel tank, and the fluid flow control valve to open, thereby permitting a flow of fuel from said fuel source through said fluid flow control valve and into said fuel tank.

10. The refueling system of claim 9, wherein when said valve is closed, the flow of fuel through said bleed line stops, causing the fluid flow control valve to close, thereby preventing fuel from flowing from said fuel source through said fluid flow control valve into said fuel tank.

11. The refueling system of claim 3, wherein said port has an inside diameter of three-quarters of an inch or less and that said float portion, said extension, and said body have a diameter smaller than said port inside diameter, thereby enabling said float portion, said extension and said body to be inserted through said port and into said fuel tank.

12. The refueling system of claim 3, further comprising a bleed flow interrupter located inline of said bleed line, said bleed flow interrupter able to interrupt said bleed flow thereby allowing an operator to test said fluid flow control valve, wherein when said bleed flow is interrupted the flow of fuel through said bleed line stops, causing the fluid flow control valve to close, thereby preventing fuel from flowing from said fuel source through said fluid flow control valve into said fuel tank.

13. A refueling system for a vehicle having a fuel tank, said fuel tank having a side wall having an internally threaded port defined therein, said refueling system comprising:

a fluid flow control valve for controlling the flow of fuel from a fuel source into said fuel tank, said fluid flow control valve connecting to a bleed line;

said bleed line interconnecting said fluid flow control valve and a float control module; and said float control module connecting to said bleed line, said float control module comprising:

a head, wherein said head comprises: an externally threaded portion having threading configured for threading into said port's internal threads, and a housing, said housing configured for rotatably receiving a drum of a central assembly therein;

said central assembly, said central assembly comprising: a drum rotatably received in said housing, an inlet port, an upper inlet bore defined through said central assembly, said upper inlet bore extending from said inlet port to an outlet port, said upper inlet bore having threading configured for receiving a threaded extension first end, and said outlet port;

said extension, said extension comprising: a tubular member having threaded ends, namely said first end and a second end, said tubular member defining a center inlet bore there-through, said first end configured for insertion through said outlet port and into threaded engagement with said upper inlet bore, said second end configured for insertion into a receiver and into threaded engagement with a lower inlet bore;

a body comprising: an upper portion, said upper portion defining said receiver, a lower portion connecting to said upper portion, said lower portion comprising an outlet, said outlet fluidly connected to said fuel tank, a lower inlet bore extending through said body from said receiver to said outlet, a valve, wherein said valve comprises a cylinder portion within said lower inlet bore, said cylinder sized for receiving a piston, wherein said piston comprises a base portion configured for sealing engagement with a seat adjacent said outlet, said piston biased in the closed position via spring, said piston having a boss extending through said outlet, said boss configured for manipulation by a cam member of a float portion's arm, said valve having an open position where bleed fluid may flow from said bleed line through said float control module and into said fuel tank, said valve having a closed position where bleed fluid is prevented from flowing through said float control module, said open and closed positions controlled by the raising and lowering of a float portion;

said float portion comprising a float arm, a float and a pivot pin, said float arm comprising said cam member, said float attaching to said float arm, and said pivot pin pivotally connecting said float portion to said lower portion, wherein rotation of said float portion at said pivot pin causing said cam member to variably contact said boss of said piston, opening and closing said valve; and a rotation lock for preventing the rotation of said central assembly within said head, said rotation lock comprising a top plate and at least one bolt, said top plate configured for engaging said central assembly, said bolt configured for fixing said top plate in engagement with said central assembly.

14. The refueling system of claim 13, wherein said drum defines a channel, said channel containing an O-ring for sealing engagement with said housing.

15. The refueling system of claim 13, wherein said central assembly comprises a connector inserted through said inlet port and threaded into said upper inlet bore, said connector connecting to said bleed line.

16. The refueling system of claim 13, wherein said port has an inside diameter of three-quarters of an inch or less and that said float portion, said extension, and said body have a diameter smaller than said port inside diameter, thereby enabling said float portion, said extension and said body to be inserted through said port and into said fuel tank.

17. The refueling system of claim 13, wherein when said valve is open, fuel can flow from said fluid flow control valve through said bleed line through said float control module and into said fuel tank, and the fluid flow control valve to open, thereby permitting a flow of fuel from said fuel source through said fluid flow control valve and into said fuel tank; and wherein when said valve is closed, the flow of fuel through said bleed line stops, causing the fluid flow control valve to close, thereby preventing fuel from flowing from said fuel source through said fluid flow control valve into said fuel tank.

18. The refueling system of claim 13, further comprising a bleed flow interrupter located inline of said bleed line, said bleed flow interrupter able to interrupt said bleed flow thereby allowing an operator to test said fluid flow control valve, wherein when said bleed flow is interrupted the flow of fuel through said bleed line stops, causing the fluid flow control valve to close, thereby preventing fuel from flowing from said fuel source through said fluid flow control valve into said fuel tank.

* * * * *